March 18, 1958     H. MAHLE     2,827,347
LIGHT METAL PISTON
Filed March 2, 1956     2 Sheets-Sheet 1

INVENTOR
Hermann Mahle

March 18, 1958     H. MAHLE     2,827,347
LIGHT METAL PISTON

Filed March 2, 1956     2 Sheets-Sheet 2

INVENTOR
Hermann Mahle

United States Patent Office 2,827,347
Patented Mar. 18, 1958

2,827,347

LIGHT METAL PISTON

Hermann Mahle, Stuttgart, Germany

Application March 2, 1956, Serial No. 569,009

Claims priority, application Germany March 9, 1955

3 Claims. (Cl. 309—13)

This invention relates to pistons. In particular, the invention is directed to the construction of a light metal piston for an internal combustion engine.

The light metal piston has a piston head, including the ring section, which is rigid and has walls much thicker than the piston skirt. Inserts of materials having a lower coefficient of heat expansion than the light metal are placed in the skirt so that the radial heat expansion of the skirt, as compared to the head, is restricted at least over the surface portion of the piston skirt comprising the bearing or thrust surfaces between the surface areas adjacent the piston pin bosses.

So far, these light metal pistons have been provided with transverse slots separating the bearing surface skirt portions from the relatively rigid piston head, because this was thought to be the only way of preventing the transfer of the heat from the relatively hot piston head as radial heat expansion to the bearing surface areas of the skirt. This construction has been successful in engines having low thermal stresses. However, in engines having high thermal stresses, the difficulty arises in that these transverse slots prevent the transfer of heat from the piston head to the skirt. Therefore, the piston head can be heated to a point where the strength of the material becomes less than a permissible value, and/or to a point where the piston rings get burned in and stuck in the grooves. The possibility of using a greater number of piston rings in order to transfer heat from the piston head to the cylinder wall is not practical because the increase in size of the piston which would be necessary would require a larger cylinder, and thus the entire structural dimensions of the engine would have to be modified.

The object of this invention is to construct a light metal piston in which heat from the piston head is transferred to the skirt.

The means by which the object of this invention is obtained is described more fully with reference to the accompanying drawings, in which.

Tests have disclosed that surprisingly a proportionately thin-walled, one piece connection between the rigid piston head and the skirt can transfer a sufficient amount of heat from the head to the skirt so as to prevent a thermal overload, and that this thin-walled connection can be made in such a way that the effect of the expansion preventing inserts in the skirt is not decreased to any important extent.

Figure 1:
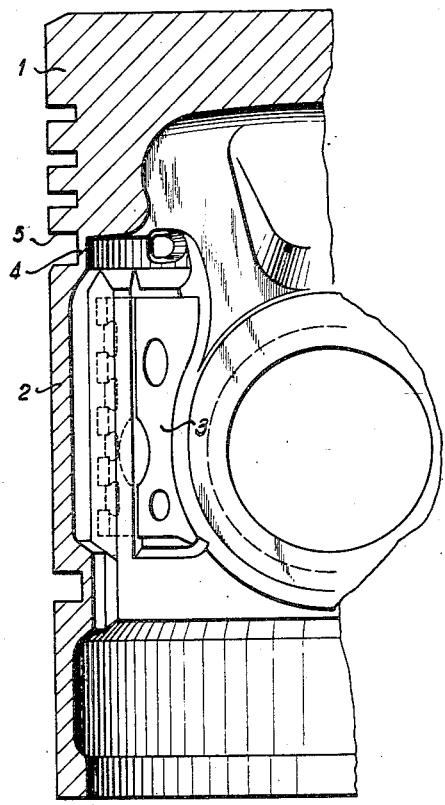
Figure 1 is a cross-sectional view through half of a piston constructed according to the invention.

As shown in Figure 1, the piston is composed of the piston head 1, including the ring section, and the skirt 2. Expansion regulating inserts 3 of a material having a lower coefficient of expansion than the light metal are fitted in the skirt and form a bimetallic body with the skirt which curves when heated and draws the bearing surface areas of the skirt inwardly. In this invention, instead of having a slot separating the skirt from the head, a thin wall or web 4, constituting a heat transfer wall, connects the skirt to the ring section of the piston head, this heat transfer wall forming the inner wall of the lowermost ring groove 5.

Wall 4 is co-extensive with either one or both of the thrust or bearing surface areas of the skirt 2. The cross-sectional area of this wall is from 1.2 to 3.0 percent, preferably from 1.2 to 2.5 percent of the top-surface area of the piston head. Wall 4 also is thinner than 2 percent of the outside diameter of the piston skirt. Tests have shown that the expansion checking effect occurring in the plan of the middle verticals of the skirt bearing surface areas adjacent the webs or heat transfer walls 4 diminishes by no more than about one-fourth to one-third as compared to the conventional construction having transverse slots instead of walls 4. This deterioration can be balanced easily by slightly increasing the ovalness of the skirt along said vertical lines. Adjacent the open end of the skirt, there is scarcely any perceptible difference in thermal expansion.

Figure 2:
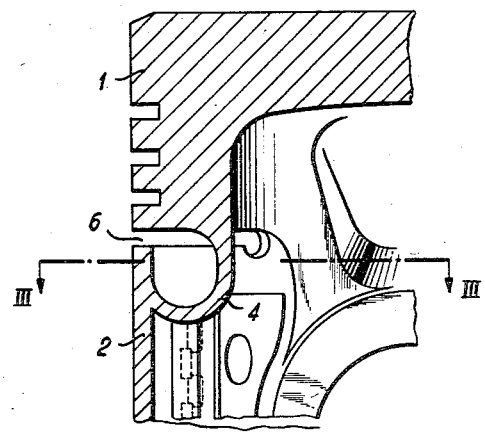
Figure 2 is a cross-sectional view through a modified form of the invention.
Figure 3:
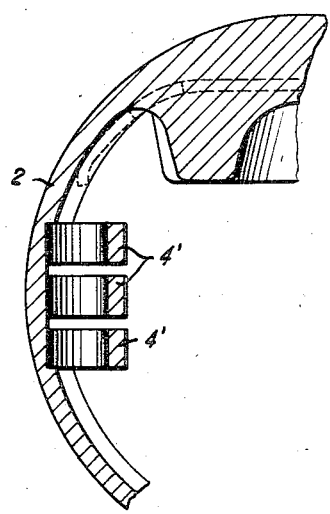
Figure 3 is a cross-sectional view on the line III—III of Figure 2.

In Figures 2 and 3, the piston head 1 is separated from skirt 2 by the slots 6. However, the piston head is connected to the skirt by webs 4', having their axis of curvature at right angles to the longitudinal axis of the piston. Because of the shape of webs 4', a resilient connection is made between the piston head and skirt, and wall thicknesses can be used up to the maximum limit of the permissible dimensions given, whereas the wall 4 of Figure 1 is advantageous only when the minimum dimensions are used.

Having now described the means by which the object of this invention is obtained, I claim:

1. In a light metal piston for internal combustion engines having a piston head with a thick wall piston head ring section, and a thin wall piston skirt into which inserts are fitted having a lower coefficient of expansion than the light metal for checking the radial heat expansion of said skirt at least along the skirt cylinder wall bearing surfaces between the piston pin bosses, the improvement comprising a heat transfer wall connecting at least the bearing surface skirt portions to said ring section, said transfer wall having a cross-sectional area ranging from 1.2 to 3.0 percent of the surface area of the piston head, and having a thickness less than 2.0 percent of the outer diameter of said skirt.

2. In a light metal piston as in claim 1, said transfer wall further comprising the wall for the piston ring groove immediately above said skirt.

3. In a light metal piston as in claim 1, said transfer wall further comprising a plurality of spaced curved webs bridging between said ring section and said skirt.

References Cited in the file of this patent

UNITED STATES PATENTS

| | | |
|---|---|---|
| 2,180,521 | Harley | Nov. 21, 1939 |
| 2,661,256 | Kuhm | Dec. 1, 1953 |

FOREIGN PATENTS

| | | |
|---|---|---|
| 1,010,981 | France | Apr. 2, 1952 |
| 873,009 | Germany | Apr. 3, 1953 |
| 701,291 | Great Britain | Dec. 23, 1953 |